March 17, 1964 SHUICHIRO TAKAHASHI ETAL 3,124,875
METHOD OF PREPARING HOLLOW TYPE HIGH DENSITY
CERAMIC NUCLEAR FUEL ELEMENTS
Filed Oct. 11, 1960
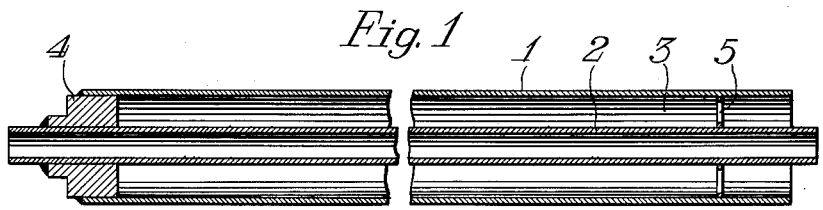
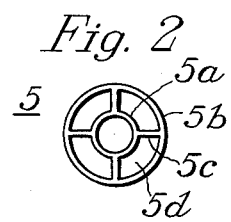
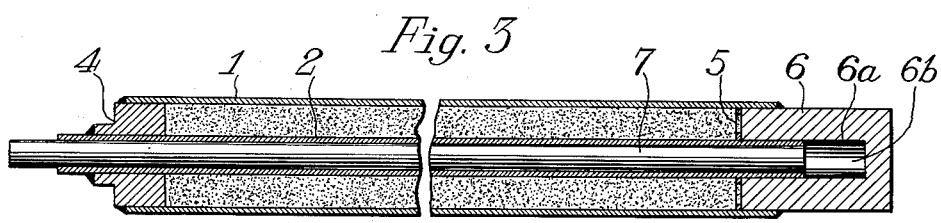
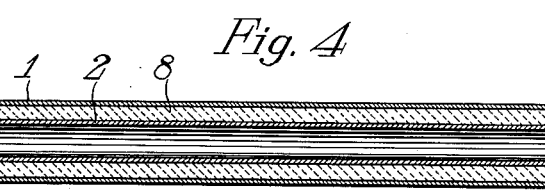

3,124,875
METHOD OF PREPARING HOLLOW TYPE HIGH DENSITY CERAMIC NUCLEAR FUEL ELEMENTS
Shuichiro Takahashi, Yutaka Honda, Kinichi Ishikawa, Hajime Uchikoshi, and Tadashi Kubota, all % Engr. & Research Lab. of Mitsubishi Atomic Power Industries Inc., 297 Kitabukuromachi 1-chome, Omiya, Japan
Filed Oct. 11, 1960, Ser. No. 61,904
Claims priority, application Japan Oct. 15, 1959
2 Claims. (Cl. 29—473.3)

This invention relates to a method of preparing hollow type high density ceramic or cermet nuclear fuel elements for use in nuclear reactors.

It has been usually practiced to prepare solid ceramic nuclear fuel elements for nuclear reactors according to the conventional powder-metallurgical process comprising the steps of compacting or pressing and sintering masses of finely fractured or powdered ceramic fuel materials such as uranium dioxide ($UO_2$) powder. It has also been known to prepare solid type high density ceramic nuclear fuel elements by rotary swaging. The rotary swaging is well known to those skilled in the art and is described in detail, for example, on pages 243–238 of "Procedures in Experimental Metallurgy" by A. U. Seybolt and J. E. Burke, copyright 1953 by John Wiley and Sons, Inc., New York.

If a ceramic nuclear fuel element as prepared according to any of these conventional procedures will be used in a nuclear reactor that portion of the element nearer the longitudinal central axis thereof will have the less neutronic density. Therefore, the portion of the element positioned on or adjacent to the longitudinal central axis has a relatively low effectiveness. On the other hand, any fuel element being used in a nuclear reactor has such a distribution of temperature that the temperature in the element is progressively reduced from the central portion toward the peripheral portion with the maximum temperature occurring on the longitudinal central axis. For this reason, that portion of the element positioned near its center may be more easily melted than the remaining portion. Furthermore, because of its temperature distribution above explained, the growth of crystal grains is greater on the central portion of the fuel element than on the portion thereof apart from the same. This leads to the occurrence of coaxial, circularly cylindrical voids within the element and accordingly to decrease in radial thermal conductivity. This results in increase in the maximum temperature on the central portion of the element which, in turn may be more easily melted.

These drawbacks can be avoided by removing the fuel material from the central portion of the fuel elements or by providing hollow ceramic fuel elements. Accordingly, a hollow ceramic nuclear fuel element including a longitudinal opening extending centrally through the same may be preferably used in place of a solid fuel element. In other words, such a hollow fuel element is advantageous in that its central portion can not have the maximum temperature excessively elevated and is prevented from melting or thermally breaking down.

One of known methods of preparing a hollow type nuclear fuel element comprises producing flat sintered pellets of annular shape having a rectangular cross section by the conventional procedure of powder metallurgy, and stacking up a multiplicity of the pellets thus produced to form a hollow cylindrical member. On the other hand, a hollow type fuel element is required to have a high density, a high accuracy of dimension, a good rectilinearity etc. However, any conventional powder-metallurgical process not only involves many treatment steps to provide hollow type nuclear fuel elements meeting such requirements, but also inevitably requires both a very high sintering temperature and a long sintering time resulting in high expense of products.

An object of the invention, therefore, is to provide an improved method of easily and inexpensively preparing hollow type high density ceramic nuclear fuel elements for nuclear reactor in which the above mentioned disadvantages can be eliminated.

Another object of the invention is to provide an improved method of preparing a hollow type high density ceramic nuclear element comprising a body of a ceramic nuclear fuel material snugly sandwiched between a pair of coaxial, circularly cylindrical sheath members of high melting-point metallic material or materials and having substantially an outside and an inside diameter predetermined and a good rectilinearity.

According to the invention, there is provided a method of preparing a hollow type high density ceramic nuclear fuel element for nuclear reactor, comprising the steps of filling up an annular space between an outer cylindrical sheath member and an inner cylindrical sheath member disposed coaxially to the same with a quantity of ceramic nuclear fuel material and then sealing the annular space, filling up a central void portion formed inside the inner cylindrical sheath member with a mandrel, and thereafter subjecting the assembly thus formed to rotary swaging to densificate and sinter the mass of the filled fuel material in high density.

Preferably, the mandrel may have a mechanical strength sufficient to withstand a high stress due to rotary swaging and to carry the inside of the inner sheath member with no deformation of the same during rotary swaging operation. For the satisfactory result the mandrel may have an elastic modulus of at least $5 \times 10^3$ kg./m.$^2$ and a yielding point of not less than 5 kg./mm.$^2$.

In order to facilitate the removal of the mandrel from the rotary-swaged product, it is preferred that the former material may have a melting point lower than that of each of the outer and inner sheath materials. Alternatively, it may be made of any suitable material more easily dissolvable in a mineral acid.

In order to prevent carbides from precipitating in the sheath members on rotary swaging, the sheath member may be formed of any suitable material such as stainless steel containing carbon in an amount not exceeding .02% by weight.

Conveniently, between an outer sheath member and a coaxial inner sheath member rigidly secured at one end to the same by means of a plug and on the other end portions of the same an annular thin support having a plurality of relatively large openings may be snugly inserted for aiding in maintaining both the members coaxial to each other and a quantity of a fractured or powdered ceramic fuel material may be poured into the annular space between both the members through the openings of the support.

In order to further improve an accuracy of dimension and a rectilinearity which are to be imparted to the final product clad with a pair of coaxial sheath members, the outer sheath member is preferably allowed to be freely elongated relatively to a mandrel closely fitted into the inner sheath member during rotary swaging. Conveniently, a plug including a central well therein may seal off an arrangement including the outer sheath member, the inner sheath member, a compact of a ceramic nuclear fuel material between both the members and the mandrel inside the inner sheath member on the end portion thereof which is lastly subjected to rotary swaging with the corresponding end portion of the mandrel supported in the said central well for sliding movement and with a suitable void left between the end of the mandrel and the bottom of the central well of the plug.

For a fuller understanding of the nature and objects of the invention, reference should be had to the following detailed description taken in conjunction with the accompanying drawings in which:

FIG. 1 shows schematically a longitudinal section of an arrangement of an outer cylindrical sheath member and an inner cylindrical sheath member disposed coaxially to the same for use in practicing the invention;

FIG. 2 shows a plan view of a support for maintaining a predetermined distance between the outer and inner sheath members;

FIG. 3 shows schematically a longitudinal section of an arrangement of the outer and inner sheath members and a mass of a ceramic nuclear fuel material compacted in an annular space therebetween ready to be subjected to rotary swaging.

FIG. 4 shows schematically a longitudinal section of the finished product according to the invention.

Referring now to FIG. 1, there is illustrated an outer, circularly cylindrical sheath member 1 of a suitable metal disposed coaxially with an inner, circularly cylindrical sheath member 2 with an annular space 3 formed therebetween. The lefthand end of the annular space 3 as viewed in FIG. 1 is closed by a plug 4 rigidly secured to the same ends of both the sheath members as by welding. The plug 4 is preferably made of a stainless steel.

The outer and inner sheath members 1 and 2 respectively serve cooperatively as tubes for clothing a finely fractured or powdered nuclear fuel material so that they are required to withstand a high stress which may be generated on rotary swaging and to have good workability. Examples of the sheath materials are stainless steels, zirconium alloys, aluminium, aluminium alloys, magnesium alloys, niobium, niobium alloys and the like. The most satisfactory result was obtained for AISI type 304L stainless steel comprising the following composition (in percent by weight):

| C | Mn | Si | P | S | Cr | Ni |
|---|---|---|---|---|---|---|
| <.03 | <2.00 | <1.00 | <.045 | <.03 | 18.0–20.0 | 8.0–12.0 |

It has been found that the use of stainless steels containing carbon in an amount not exceeding .02% can greatly prevent carbides from precipitating in the sheath member on rotary swaging. If carbides will precipitate in the sheath member during swaging operation, then stress will be concentrated on the portion of the same where the carbides have been precipitated. Therefore, the precipitation of carbides must be avoided.

It is to be understood that any defects such as streaks, cracks or the like on both the internal wall surface of the outer sheath member and the internal and external wall surfaces of the inner sheath member 2 should be preliminarily removed by mechanical finishing and chemical or electrolytic polishing process.

In order to aid in maintaining the inner sheath member 2 coaxial to the outer sheath member 1, a support 5 is snugly inserted in the annular space 3 at a predetermined position dependent upon a quantity of a ceramic nuclear fuel material filling up the annular space 3. The support 5 which may preferably be made of a length of a stainless steel wire comprises an inner ring-like portion 5a adapted to engage the external wall surface of the inner sheath member 2, an outer ring-like portion 5b adapted to engage the internal wall surface of the outer sheath member 1, a plurality of radial arm portions 5c connecting the inner and outer ring-like portions, and a plurality of sectorial openings 5d with the respective portions connected to each other by welding (see FIG. 2). The diameter of the wire used may range from .3 to .5 mm. Alternatively, the support 5 may be made of a sheet metal and preferably of a stainless steel having a thickness of approximately .5 mm. by stamping or punching the same in a desired configuration. In this case, the respective portions of the support may be, if desired, connected to each other by welding.

With the support 5 inserted in the annular space 3 in place, the end portion of the inner sheath member 2 will extend externally beyond the support 5 and its extremity projects preferably externally beyond the extremity of the outer sheath member 1 by a short distance which may be approximately 5 mm.

After the outer sheath member 1 has been coaxially secured to the inner sheath member 2 through the front plug 4 and the support 5 as previously described and shown in FIG. 1, a quantity of a finely fractured or powdered ceramic nuclear fuel material such as uranium dioxide ($UO_2$) powder can be poured into the annular space 3 through the openings 5d of the support 5 until it will fill up the space confined by the sheath members, the front plug and the support. For obtaining a high density nuclear fuel element it is desirable to make the bulk density of the filled fuel material high as possible. Therefore, the sheath members with the quantity of the fuel material can be vibrated by any suitable vibrating device to render the tapped density of the fuel material high. Thus, the space 3 confined by the two sheath members 1 and 2, the front plug 4 and the support 5 has been filled up with the compact of the fuel material having a high tapped density.

Then a rear plug 6 as will subsequently be described is inserted into the annular space between the outer and inner sheath members until it abuts against the support 5 as shown in FIG. 3. The rear plug 6 which may preferably be made of stainless steel has an outside diameter substantially equal to the inside diameter of the outer sheath member 1 and a central well 6a—6b whose diameter is substantially equal to the outside diameter of the inner sheath member. With the plug 6 fitted into the space 3 in a position shown in FIG. 3, the end portion of the inner sheath member 2 extends partially through the well 6a—6b for axially sliding movement leaving a void 6b between the end face of the former and the bottom of the latter. The void 6b ensures that the inner sheath member 2 and a mandrel fitted into the same as will be described hereinafter in detail are allowed to be satisfactorily elongated during the subsequent rotary swaging operation.

A raw element to be subjected to rotary swaging is completed by fitting into the inner sheath member 2 a mandrel 7 having a diameter equal substantially to the inside diameter of the same. As previously pointed out, the mandrel is necessarily made of a material having mechanical strength sufficient to withstand a high stress due to rotary swaging and to carry the inside of the inner sheath member with no deformation of the same during rotary swaging operation. The satisfactory results are obtained when the mandrel has an elastic modulus of at least $5 \times 10^3$ kg./mm.$^2$ and a yielding point of not less than 5 kg./mm.$^2$. Further, the mandrel is required to be readily removed from the inner sheath member after the completion of rotary swaging. For this purpose, the material of the mandrel should have a melting point lower than that of each of the outer and inner sheath materials whereby the mandrel can be readily removed from the inner sheath member by melting the same. Alternatively, it should be more easily dissolved in a mineral acid than each of the sheath materials. With the two sheath members made of stainless steel, the material of the mandrel is necessary to have a melting point less than 1200° C.

Suitable examples of the mandrel materials are zinc alloys, magnesium alloys, aluminum alloys, tin alloys, nickel and its alloys, copper alloys, iron alloys, silver alloys, cadmium and its alloys, antimony and its alloys and the like. The preferred examples of such materials are a zinc alloy comprising 4.1% aluminum, .08% magnesium and the balance zinc, and having an elastic modulus of 7600 kg./mm.$^2$ and a yielding point of 9.5 kg./mm.$^2$ at .013% offset; and 95% copper-5% zinc alloy, 85% copper-15% zinc alloy and 70% copper-30% zinc alloy. These copper-zinc alloys have elastic moduli of 13,700, 13,700 and 11,240 kg./mm.$^2$ respectively and yielding points of 7.0, 7.0 and 9.8 kg./mm.$^2$ at .013% offset respectively. In general, alloys comprising 3 to 6% of aluminum, 0 to 5% of copper, .013 to .1% of magnesium the balance zinc can be satisfactorily used.

In addition to a single body of any of the metals just abovementioned, the mandrel may be formed of coaxial laminations of two or more metals suitably selected among the abovementioned ones. Also, the mandrel may be formed by clothing a length of piano wire including .65–.95% C, and .12–.32% Si and having an elastic modulus of 21,000 kg./mm.$^2$ and a yielding point of 80 to 150 kg./mm.$^2$, with a zinc alloy or the like.

One method of preparing the mandrel will now be described in conjunction with the use of a zinc alloy comprising the first-mentioned composition. An ingot of such an alloy is melted and cast in a circular bar. The bar then is reduced in cross-sectional area as by swaging until it can be snugly fitted into an inner sheath member.

A raw element produced as previously described can now be passed to a rotary swaging machine with automatically feeding means (not shown). Rotary swaging must be started on that end portion of the raw element on which the front plug 4 has been rigidly secured to the outer and inner sheath members 1 and 2 respectively, that is to say, the lefthand end portion thereof as viewed in FIG. 3, and then proceeds successively toward the other end portion or the righthand end portion of the same as viewed in FIG. 3. The swaging operation should not be started on the righthand end portion.

In the initial stage of the rotary swaging operation, the mass of the fuel material is compacted and correspondingly the outer sheath member 1 is reduced in diameter. After the density of the fuel compact has reached its saturated value, not only the mandrel 7 but also the inner sheath member 2 are remarkably elongated and the members are reduced in wall thickness. The elongation results in axial strain of the raw element. According to the invention, the rear plug 6 is provided for slidably supporting the end portion of the mandrel 7 in the well 6a of the same. This allows the mandrel to be freely elongated without any strain occurring in the same. If a hollow type UO$_2$ element will be prepared by rotary swaging, the element will have an elongation of from 15 to 30% at a working degree of from 30 to 40% and also the entire of its raw element will be elongated. In this connection, it is preferable that the well 6a—6b in the rear plug 6 should have a depth equal to the order of ten hundredths of the total length L of the outer sheath member 1 and that the lengths of that portion of the inner sheath member 1 and hence of the mandrel 7 extending initially into the well portion 6a and the length of the void well portion 6b are approximately five hundredths of the total length L respectively.

When the raw element referred to is subject to rotary swaging, concentrated stresses are repeatedly generated in the fuel compact within the same. In response to these stresses, a macroscopic and a microscopic rearrangement of crystal structure will occur in the fuel compact. In other words, rapidly repeated dynamic stresses due to rotary swaging will rapidly cause both displacement of particles and atomic diffusion within the fuel compact whereby the compact will be made very dense and sintered in a solid body having a high density. For example, if a UO$_2$ compact will be subjected merely to cold rotary swaging in the manner as previously described to form a ceramic fuel element, the final density may reach a value exceeding 85% of its theoretical density. With such rotary swaging carried out at a temperature less than two thirds of the conventional sintering temperature for several minutes, the UO$_2$ compact between the outer and inner sheath members can have a density substantially equal to that of a UO$_2$ pellet prepared by the conventional power-metallurgical technique. Experiments indicated that cold swaging and hot swaging at a temperature ranging from 800° to 1100° C. gave the maximum swaged densities equal to 91% and 95% of the theoretical value respectively.

During the rotary swaging operation, the inner sheath member is applied with high dynamic stresses by the high strength mandrel disposed inside the same. This ensures that the inner sheath member preserves the uniform thickness of its wall, a precise roundness and a good rectilinearity as does the outer sheath member. If a raw element including no mandrel would be subjected to rotary swaging, then the cross section of the inner sheath member may readily be deformed in the shape of irregular circle. Therefore, it can never be expected to provide a hollow type nuclear fuel element having its central opening in the shape of precise circle. It is also apparent that, on rotary swaging crack will be formed on the irregularly deformed portions of the inner sheath member 2 resulting in the impossibility of satisfactorily solidifying the fuel material compact between the outer and inner sheath members.

With the outer and inner sheath members made of stainless steel, the precipitation of carbides causes stress concentration on those portions of the members where the carbides have been precipitated during the rotary swaging operation. This stress concentration produces and grows microscopic cracks. The rotary swaging operation successively effected cause additional stresses to be concentrated in the vicinity of the microscopic cracks to thereby develop secondary microscopic cracks and to grow the primary and secondary microscopic cracks into large severe cracks. For this reason, any shroud sheath including microscopic cracks can not be used to clothe a nuclear fuel element. It has been found that a sheath material containing carbon in an amount less than .02% is effectively protected against the precipitation of carbides, whereby the disadvantage just above described can be avoided with the excellent products prepared.

After the completion of rotary swaging the mandrel 7 can be removed from the swaged element either by heating and melting the mandrel or by dissolving the same in any suitable mineral acid as the case may be. Thereafter each end portion of the swaged element is cut off and then resealed by welding resulting in a hollow type nuclear fuel element which is illustrated in FIG. 4. In FIG. 4 a swaged, densificated body of a nuclear fuel material 8 is shown as being disposed between outer and inner sheath members 1 and 2 respectively and in intimate contact with the same. It is also seen the finished element has an outside diameter less than that of the starting outer sheath member.

The following examples illustrate the practice of this invention.

*Example I*

As previously described in conjunction with FIGS. 1 and 3, an outer, circularly cylindrical tube of AISI type 304L stainless steel having an outer diameter of 12 mm., a wall thickness of .5 mm. and a length of 1000 mm.

was welded at one end coaxially to an inner circularly cylindrical tube of the 304L stainless steel having an outside diameter of 6.5 mm., a wall thickness of .5 mm. and a length of 1050 mm. through a front plug of the same steel. A support of a wire as previously described abutted against both the internal wall surface of the outer tube and the external wall surface of the inner tube adjacent to the other end of the outer tube at a distance of about 52 mm. measured from the nearer end of the inner tube. The internal wall surface of the outer tube and the external and internal wall surfaces of the inner tube was preliminarily made smooth by mechanical finishing and chemical or electrolytic polishing, thereby removing surface defects such as streaks, slags, cracks etc.

A quantity of $UO_2$ powder was poured into an annular space formed between both the tubes through the openings of the support until it filled up a space confined by the two tubes, the front plug and the support with the tapped density of the filled powder reaching 70% of its theoretical value by vibrating the same by a suitable vibrating device.

Then the rear plug as previously described was welded to the other end of the outer tube in the manner previously mentioned. The welded plug had its void well portion about 52 mm. in length.

A mandrel made of a zinc alloy comprising 4.1% Al, .04% Mg and the balance Zn was snugly fitted in the inner tube as shown in FIG. 3 to form a raw element. The mandrel was produced by melting an ingot of the zinc alloy just above mentioned and casting the molten alloy in bar having a diameter of 12.5 mm. Then the bar was subjected to swaging to reduce its cross sectional area until it could be just fitted into the inner tube.

The raw element thus prepared was subjected to rotary swaging to densificate and sinter the $UO_2$ compact. The solidified $UO_2$ body has a density equal to 89% of its theoretical value.

The mandrel was then removed from the swaged product by melting the same.

Both end portions of the swaged element was cut off and then re-sealed by welding to complete a hollow type high density nuclear fuel element.

As the accuracy of dimension of products having been subjected to swaging, the outer tube had its outside diameter of 9.5±.02 mm., its wall thickness of .45±.02 mm., and the inner tube had its outside diameter of 5.2±.02 mm. and its wall thickness of .48±.02 mm.

The finished element was substantially straightened with a deviation from a reference straight line less than .25 mm. per meter.

*Example II*

An outer tube and an inner tube were made of the same steel as that used in Example I and the procedure of Example I was repeated except that the outer tube was an outside diameter of 20 mm., a wall thickness of 1.0 mm. and a length of 200 mm. and that the inner tube was an outside diameter of 10 mm., a wall thickness of 1.0 mm. and a length of 230 mm. Correspondingly, a support, plugs and a mandrel were changed in dimension.

A tapped density of $UO_2$ powder used was 70% of the theoretical density and a swaged density was 88% of the same.

The swaged outer tube had its outside diameter of 16.65±.02 mm. and its wall thickness of .98±.02 mm., and the swaged inner tube had its outside diameter of 7.56±.02 mm. and its wall thickness of .98±.02 mm.

The finished element was substantially straightened as in Example I.

From the foregoing it will be apparent that, the present invention can easily prepare hollow type nuclear fuel elements at a high rate of production and at a low cost, which have high swaged densities of ceramic fuel material and are accurate in dimensions of their outside and inside diameters with the cross section precisely circular.

While the invention has been described as using $UO_2$ as a nuclear fuel material, it is to be understood that the invention may be equally applicable to the preparation of hollow type high density ceramic or cermet nuclear fuel elements from ceramics and cermets formed of oxides, carbides, or silicides of conventional nuclear fuel materials such as uranium, thorium, plutonium and the like, or of any suitable mixture thereof.

Since various changes may be made in the above-described method and different embodiment of this invention may be made without departing from the spirit and scope thereof, it is intended that all matter contained in the foregoing description or shown in the accompanying drawings shall be interpreted as illustrative and not in a limiting sense.

What we claim is:

1. A method of making a metallic clad nuclear reactor fuel element comprising, providing a given quantity of nuclear reactor fuel material, confining said fuel material in an elongated cylindrical tubular metallic sheath having an outer sheath portion and inner coaxial sheath portion defining an axially extending bore therethrough and a tubular space between said portions with one end open and an opposite end closed, inserting a mandrel through said bore the full length thereof and fitting snugly therein, said mandrel having an elastic modulus of at least $5 \times 10^3$ kg./mm.$^2$ and a yield point of not less than 5 kg./mm.$^2$ and having a melting point less than the melting point of said inner and outer portions of said metallic sheath, subjecting the tubular sheath to rotary swaging to reduce the outer diameter of said sheath and compress said outer sheath portion radially inwardly while permitting elongation thereof thereby to compact and densify nuclear reactor fuel material in said space without reduction of the diameter and said bore, melting said mandrel and removing the melted mandrel from said bore, before beginning said rotary swaging filling said tubular space with nuclear reactor fuel material and confining it therein, removing the opposite end portions of said coaxial sheath portions, and subsequently sealing the ends of the remaining metallic sheath tubular space filled with dense compacted fuel material thereby sealing said fuel material therein.

2. A method of making a metallic clad nuclear reactor fuel element comprising, providing an elongated cylindrical tubular metallic sheath having an outer sheath portion and inner coaxial sheath portion defining an axially extending bore therethrough and a tubular space between said portions with one end closed and an opposite end open, inserting a mandrel through said bore the full length thereof and fitting snugly therein, said mandrel having an elastic modulus of at least $5 \times 10^3$ kg./mm.$^2$ and a yield point of not less than 5 kg./mm.$^2$, subjecting the tubular sheath to rotary swaging to reduce the outer diameter of said sheath and compress said outer sheath portion radially inwardly along its full length while permitting elongation thereof thereby to compact the densify nuclear reactor fuel material in said space without reduction of the diameter of said bore, removing said mandrel from said bore, before beginning said rotary swaging filling said tubular space with nuclear reactor fuel material and confining it therein, said mandrel having a melting point less than the melting point of said inner and outer portions and said mandrel being subjected to heat to melt it without melting said sheath portions and thereby permitting removal of said mandrel in a melted condition, removing the opposite end portions of said coaxial sheath portions, and subsequently sealing the ends of the remaining metallic sheath tubular space filled with dense, compacted fuel material thereby sealing said fuel material therein.

(References on following page)

References Cited in the file of this patent

UNITED STATES PATENTS

| | | |
|---|---|---|
| 2,781,308 | Greutz et al. | Feb. 12, 1957 |
| 2,805,473 | Handwerk et al. | Sept. 10, 1957 |
| 2,848,800 | Maloney et al. | Aug. 26, 1958 |
| 2,941,933 | Roake et al. | June 21, 1960 |
| 2,983,660 | Loeb et al. | May 9, 1961 |
| 2,992,172 | Blainey et al. | July 11, 1961 |
| 3,004,907 | Pecht et al. | Oct. 17, 1961 |

FOREIGN PATENTS

| | | |
|---|---|---|
| 841,608 | Great Britain | July 20, 1960 |

OTHER REFERENCES

Nuclear Power, vol. 5, No. 56, December 1960, page 82 relied upon.

Proceedings of the 2nd U.N. Conference on Peaceful Uses of Atomic Energy, September 1958, vol. 8, page 500.